Feb. 1, 1966    J. G. WALLER    3,232,065
METHOD AND APPARATUS FOR STORING OZONE/OXYGEN MIXTURES
Filed April 23, 1964    2 Sheets-Sheet 2

INVENTOR
JOHN GEORGE WALLER

By Shoemaker and Mattare
ATTORNEYS 3,232,065
METHOD AND APPARATUS FOR STORING OZONE/OXYGEN MIXTURES
John George Waller, Sutton, Surrey, England, assignor to The British Oxygen Company Limited, London, England, a British company
Filed Apr. 23, 1964, Ser. No. 362,061
Claims priority, application Great Britain, Apr. 27, 1963, 16,650
26 Claims. (Cl. 62—45)

This invention relates to methods and apparatus for the storage and transport of gaseous ozone/oxygen mixtures containing up to 13% by weight of ozone.

There has been various attempts to store ozone and mixtures of ozone with another gas, such as oxygen, containing high proportions of ozone. Pure ozone is in itself a hazardous material, liable to explosive decomposition not only in storage but also during its passage through valves, pipelines, and like apparatus. Attempts at storing pure ozone, or mixtures such as ozone/oxygen mixtures containing a high proportion of ozone, even if successful, thus raise difficulties in the transfer of the ozone to and from the storage vessel.

In order to overcome the hazardous nature of ozone itself, it is frequently mixed with a high proportion of another gas, and since the normal preparation of ozone from oxygen results in the production of an ozone product containing an excess of unreacted oxygen, it is natural that ozone should frequently be supplied and stored in the form of a mixture with oxygen. It has been found that if the ozone content of the mixture does not exceed 13% by weight at ambient temperature, it is possible to handle the mixture without danger of explosive decomposition.

Attempts have been made to store ozone/oxygen mixtures in the liquid phase; these, however, suffer from the disadvantage that the oxygen is more volatile than the ozone and the concentration of ozone in the liquid consequently rises as oxygen evaporates. Similarly, attempts to store ozone as a solution in a less volatile solvent lead to difficulties in handling the high ozone concentrations in the gas drawn off. In general, mixtures of ozone and oxygen cannot be stored by dissolving in a solvent owing to the higher solubility of the ozone.

It is an object of the present invention to provide a method and apparatus for storing compressed ozone/oxygen mixtures containing up to 13% by weight of ozone in the gaseous phase under pressure and without the use of a solvent.

According to one aspect of the present invention, there is provided a method of storing a compressed gaseous ozone/oxygen mixture containing up to 13% by weight of ozone, wherein the mixture is stored at an elevated pressure and at a temperature appreciably below ambient temperature in a metal pressure vessel having those parts which come into contact with the mixture covered with a thin, coherent coating which is relatively inert to ozone, the conditions of concentrations, pressure and temperature being such that no liquid phase separates from the mixture.

According to a second aspect of the invention, apparatus for storing a compressed gaseous ozone/oxygen mixture containing up to 13% by weight of ozone comprises a metal pressure vessel having those surfaces thereof which in use come into contact with the ozone/oxygen mixture covered with a thin, coherent coating which is relatively inert to ozone, and provided with means whereby the contents of said vessel can be cooled to a temperature appreciably below ambient temperature.

The pressure vessel used in the present invention may be made from any suitable metal, for example, a ferrous metal or alloy, in particular stainless steel, or aluminium.

The process and apparatus of the present invention have been found to be suitable for the storage of gaseous ozone/oxygen mixtures containing 13% by weight of ozone at pressures of up to 70 atmospheres, up to which pressure, it has surprisingly been found, such ozone/oxygen mixtures are safe from explosive decomposition.

The coating which is used to protect the parts of the pressure vessel which in use come into contact with the ozone/oxygen mixture may be as thin as is consistent with its efficiently performing its protective function and will in any case be thin relative to the thickness of the wall of the pressure vessel. The coating may for example be a coherent sulphate, oxide, or phosphate layer produced by any suitable method, for example, by subjecting the parts of the pressure vessel which are to be coated to a suitable chemical bath, or to electrolytic treatment, or alternatively by spraying a suitable coating material, such as, for example, alumina, on to the parts of the pressure vessel which are to be coated.

A phosphate coating has been found to be particularly suitable for use in the process of the present invention and may be produced, for example, by immersing the surface to be coated in a chemical solution containing phosphate, or by anodic treatment of the surface in a solution containing phosphate. Such a phosphate coating may also contain other substances, such as oxides, borates, silicates and the like, provided that the coating formed is thin and coherent, so that it will continue to adhere to the metal surface after impact or strain, that the coating does not contain any substances, particularly organic substances, which cause decomposition of ozone, and that the greater part of the coating consists of phosphates of the metal or metals of which the vessel is constructed.

When, as is preferred, stainless steel is used as the material of construction of the pressure vessel, a simple method of producing a suitable coating is to bring those surfaces of the vessel which in use come into contact with ozone/oxygen mixture into contact with a dilute solution of ortho-phosphoric acid, for example, by filling the vessel with such a solution leaving the solution in contact with the metal for a time sufficient to produce the coating, allowing the solution to drain from the vessel, and then, without washing or rinsing, drying the vessel by the application of gentle heat. Phosphate coatings produced in this manner have proved to be thin and coherent and have been found almost entirely to inhibit the decomposition of ozone in the ozone/oxygen mixtures. The effectiveness of a coating produced in this manner may be illustrated by the following example:

Two identical pressure vessels were made of stainless steel, one being left untreated and the other being provided with an internal phosphate coating produced by filling the vessel with dilute phosphoric acid, allowing it to remain therein for two hours, removing the phosphoric acid by emptying and draining the vessel, and without rinsing the vessel, drying it in an oven at 160° C. for ten hours.

Both vessels were then filled with a mixture of ozone and oxygen, the vessels and contents being maintained at —78° C. The untreated vessel was filled with a mixture containing 8.7% of ozone and after two days the ozone concentration had fallen to 7.1%. The vessel provided with the phosphate coating was filled with a mixture containing 8.6% by weight of ozone; after two days the ozone concentration was still 8.6%, and after twenty days, the ozone concentration was 8.4%.

Any convenient method may be used for maintaining the stored ozone/oxygen mixture at a temperature appreciably below ambient temperature, but one method which has given excellent results in practice is by the use of solid carbon dioxide. Conveniently, the pressure vessel may be formed with an external depression or pocket into which solid carbon dioxide may be introduced. To prevent wastage of the refrigerant, the storage vessel is preferably lagged with some sort of heat insulant.

The invention will now be further described with reference to the accompanying drawings, in which.

Figure 1:
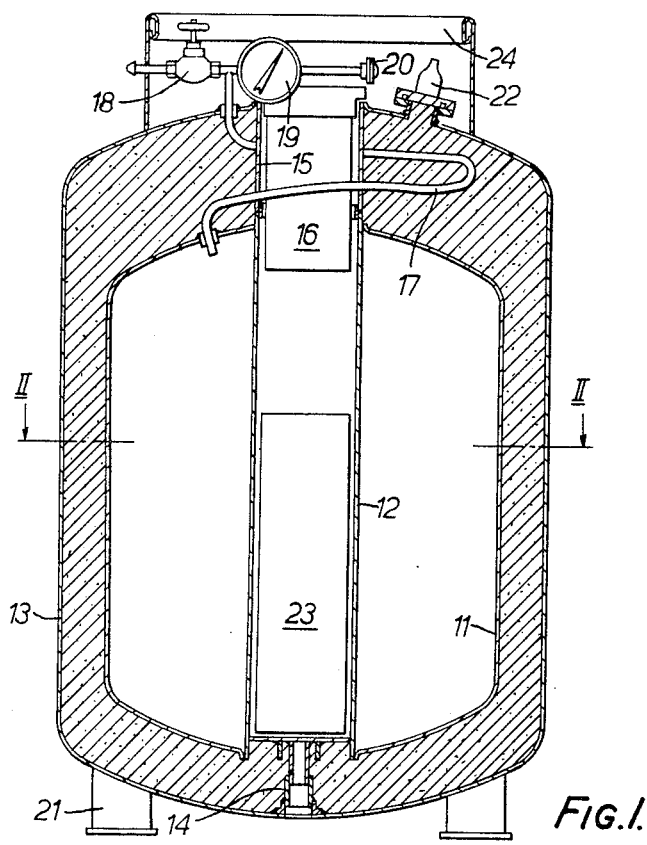
FIGURE 1 is a side sectional view of one form of apparatus according to the invention suitable for the storage and transport of ozone/oxygen mixtures under a pressure of 15 atmospheres above atmospheric pressure.
Figure 2:
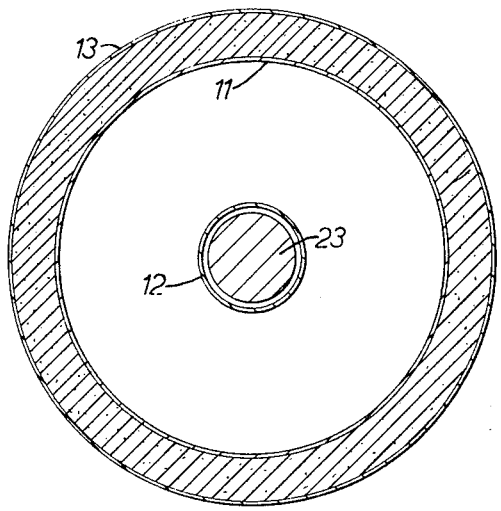
FIGURE 2 is a section along the line II—II of FIGURE 1.

Referring to FIGURE 1, the apparatus includes a pressure vessel 11, made from stainless steel sheet of suitable thickness by any suitable method, for example, by welding using the inert gas shielded arc welding process, and in which the ozone/oxygen mixture is stored.

The top of the vessel 11 is formed with a tubular pocket 12 extending downwardly to the bottom of the vessel and of such a size and shape as conveniently to receive a standard size block of solid carbon dioxide.

The vessel 11 is suspended by an upward extension 15 of the pocket 12 within an outer container 13 made of stainless steel, and supported at its lower end by a support 14 made of heat insulating material. The container 13 is supported on three tubular legs 21. The upward extension 15 of the pocket 12 is welded at its upper end into a corresponding opening in the top of the container 13, so that a solid carbon dioxide block can be inserted through the opening into the pocket. The extension 15 is also adapted to receive a stopper 16 made of a material of low thermal conductivity, the lower end of which when the stopper is inserted in the extension 15 closes the mouth of the pocket 12. The interspace between the outer wall of the vessel 11 and the inner wall of the container 13 may be filled with a suitable light-weight heat insulating material, such as "Porosil," or filled with an insulating powder and evacuated, as hereinafter described.

The top of the vessel 11 is provided with a filling and discharge tube 17 arranged to coil about the extension 15 within the interspace between the vessel 11 and the outer container 13, before passing through the wall of the container 13 to discharge through a control valve 18. The portion of the tube 17 between the vessel 11 and the valve 18 and outside the container 13 is provided with connections to a pressure gauge 19 and a bursting disc 20.

After the vessel 11 has been constructed and before it is housed within the container 13, it is coated internally with a thin coherent phosphate coating by filling it with aqueous phosphoric acid, containing 30% by weight of $H_3PO_4$, and allowing the acid to remain in the vessel for two hours at ambient temperature. The acid is then drained from the vessel and the vessel, without rinsing, is dried for 10 hours at 120° C. The vessel is then assembled within the container 13 and is ready to receive an ozone/oxygen mixture.

In use, the ozone/oxygen mixture is stored in the vessel 11 itself, and a block of solid carbon dioxide indicated at 23 is placed in the pocket 12 to maintain the contents of the vessel at the desired storage temperature, the stopper 16 being replaced after the block has been inserted in order to minimize heat inleak to the solid carbon dioxide. As previously stated, the pocket 12 is conveniently made of such a size and shape that it just accommodates a block of solid carbon dioxide of a size available commercially. The heat transfer between the block and the metal wall of the pocket may be improved by adding a small amount of an inert liquid having a low freezing point, such as, for example, a fluorinated hydrocarbon, to fill the gap between the block and the inner wall of the pocket.

The outer container 13 preferably forms a vacuum jacket, the space between the vessel 11 and the container 13 being evacuated through a connection 22 and, if required, filled with a suitable insulating powder.

The valve 18, gauge 19, bursting disc 20 and vacuum connection 22 are protected by a ring 24.

A vessel constructed as described above can be made of a size capable of holding 100 cubic feet (measured at S.T.P.) of a mixture of 10% by weight of ozone and oxygen compressed to a pressure of 15 atmospheres above atmospheric, making use of standard blocks of solid carbon dioxide seven inches in diameter, such as are readily available commercially. With high-grade thermal insulation, such as is provided by a power-filled vacuum jacket, one such block is sufficient to keep the temperature constant for about a week, further blocks being added at a rate of roughly one per week during a prolonged storage. The ozone/oxygen mixture stored under these conditions does not show any significant decomposition after a period of eighty days.

Figure 3:
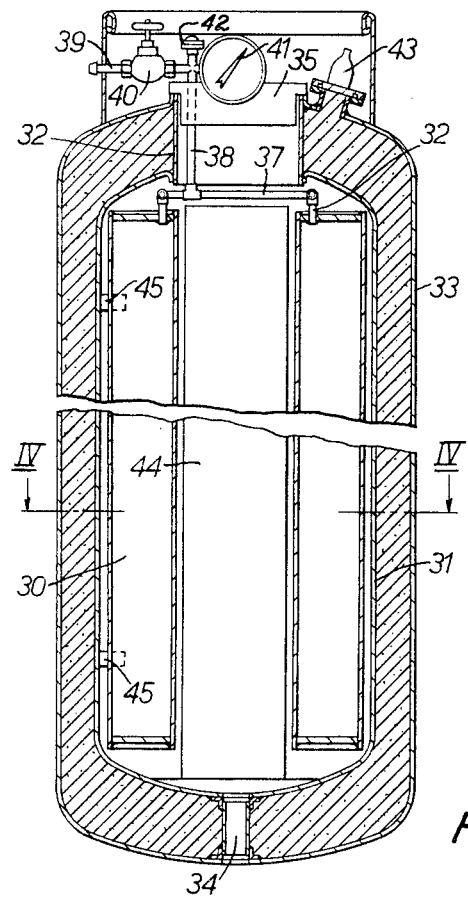
FIGURE 3 is a side sectional view of an alternative form of apparatus according to the invention suitable for the safe storage and transport of ozone/oxygen mixtures under a pressure of 70 atmospheres above atmospheric pressure.
Figure 4:
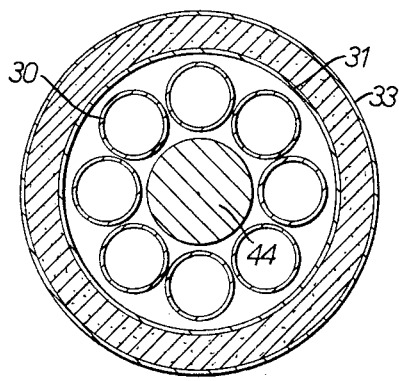
FIGURE 4 is a section along the line IV—IV of FIGURE 3.

Referring now to FIGURES 3 and 4, which illustrate an alternative form of apparatus according to the invention, in this embodiment, the ozone/oxygen mixture is stored under pressure in eight separate cylindrical pressure vessels 30 arranged in a circle within an inner container 31 which is provided with a neck portion 32 by which it is suspended within an outer container 33 made of stainless steel, and supported at its lower end by an insulated support 34. The upper end of the neck portion 32 is welded to the periphery of an aperture in the top of the outer container 33, which aperture is adapted to be closed by a stopper 35 of insulating material. The tops of individual pressure vessels 30 are connected by pipes 36 to a manifold 37 which is itself connected by a pipe 38 passing through the stopper 35 to a filling and discharge line 39, provided with a control valve 40 and a pressure gauge 41 and bursting disc 42. The outer container 33 is provided with a vacuum connection 43 which is also adapted to serve as an inlet for the introduction of powder into the interspace between the inner container 31 and the outer container 33. The pressure vessels 30 are so arranged in the inner container 31 that the space within the circle of vessels is of such size as to accommodate a block of solid carbon dioxide 44 of a size which is commercially available. The vessels 30 are held in position within the inner container 31 by means of brackets 45.

Such an arrangement has the advantage that the pressure system is separate from the vacuum system for the insulating jacket, the vessels 30 which are under pressure being separated from the vacuum jacket by the inner container 31 which is under atmospheric pressure.

What I claim as my invention and desire to secure by Letters Patent of the United States is:

1. A method of storing a compressed gaseous ozone/oxygen mixture containing up to 13% by weight of ozone which comprises the steps of coating those parts of the walls of a metal pressure vessel which in use are in contact with the contents of said vessel with a thin coherent coating which is relatively inert to ozone, and thereafter confining said compressed gaseous mixture within said pressure vessel at a temperature appreciably below ambient temperature.

2. A method of storing a compressed gaseous ozone/oxygen mixture containing up to 13% by weight of ozone which comprises the steps of coating those parts of the walls of a metal pressure vessel which in use are in contact with the contents of said vessel with a thin coherent, fully oxidized inorganic coating which is relatively inert to ozone, and thereafter confining said compressed gas mixture within said pressure vessel at a temperature appreciably below ambient temperature.

3. A method of storing a compressed gaseous ozone/oxygen mixture containing up to 13% by weight of ozone which comprises the steps of coating those parts of the walls of a metal pressure vessel which in use are in contact with the contents of said vessel with a thin coherent, phosphate coating, and thereafter confining said compressed gas mixture with said pressure vessel at a temperature appreciably below ambient temperature.

4. A method of storing a compressed gaseous ozone/oxygen mixture containing up to 13% by weight of ozone which comprises the steps of filling a stainless steel pressure vessel with a dilute solution of ortho-phosphoric acid, leaving said solution in said vessel for a time sufficient to form a thin coherent phosphate coating on the inner surface thereof, draining said solution from said vessel, drying said vessel by gentle heating, and thereafter confining said compressed gas mixture within said pressure vessel at a temperature appreciably below ambient temperature.

5. A method of storing a compressed gaseous ozone/oxygen mixture containing up to 13% by weight of ozone which comprises the steps of coating those parts of the walls of a metal pressure vessel which in use are in contact with the contents of said vessel with a thin coherent coating of alumina, and thereafter confining said compressed gas mixture within said pressure vessel at a temperature appreciably below ambient temperature.

6. A method according to claim 5 wherein said alumina is applied by spraying.

7. A method according to claim 5 wherein said mixture is confined in said vessel at a temperature of about $-78°$ C.

8. A method according to claim 7, including the step of cooling said pressure vessel and the mixture confined therein to a temperature of about $-78°$ C. by means of solid carbon dioxide.

9. A method according to claim 8 wherein said solid carbon dioxide is surrounded by an inert liquid of low freezing point wherein gaps between the outer surface of said block and the walls of said pocket are filled with an inert liquid of low freezing point.

10. A method according to claim 1 wherein said ozone/oxygen mixture is confined in said vessel under a superatmospheric pressure not exceeding 70 atmospheres above atmospheric pressure.

11. A gas storage device comprising a pressure and gas-tight vessel, means for admitting and discharging gas, said vessel being filled with a compressed gaseous ozone/oxygen mixture containing up to 13% by weight of ozone, a thin coherent inorganic coating covering those parts of the walls in contact with said mixture, said coating being relatively inert to ozone, and means for cooling the contents of said vesel to a temperature appreciably below ambient temperature.

12. A device according to claim 11 wherein said coating is a phosphate coating.

13. A device according to claim 12 wherein said phosphate coating is formed by immersing those parts of the walls of said vessel to be coated in a chemical solution containing phosphate.

14. A device according to claim 13 wherein said vessel is of stainless steel, and wherein said phosphate coating is formed by filling said vessel with a dilute solution of ortho-phosphoric acid, leaving the solution in contact with said vessel for a time sufficient to form the coating, draining the solution from said vessel and thereafter drying said vessel by gentle heating.

15. A device according to claim 11 wherein said coating is of alumina.

16. A device according to claim 15 wherein said alumina is applied by spraying.

17. A device according to claim 11 wherein said cooling means comprises a pocket formed in the outer wall of said vessel and a refrigerant contained therein.

18. A device according to claim 17 wherein said pocket is of tubular form.

19. A device according to claim 18 wherein said refrigerant is in the form of a block of solid carbon dioxide.

20. A device according to claim 17 wherein the mouth of said pocket is closed by a removable stopper made of a material of low thermal conductivity.

21. A device according to claim 11 including a thermally insulating jacket surrounding said vessel.

22. A device according to claim 21 wherein said thermally insulating jacket is formed by an outer container within which said pressure vessel is supported by supports of heat insulating material, the space between the inner wall of said outer container and the outer wall of said pressure vessel being filled with heat insulating material.

23. A device according to claim 21 wherein said thermally insulating jacket is a vacuum jacket.

24. A device according to claim 23 wherein said thermally insulating jacket is a powder-filled vacum jacket.

25. A gas storage device comprising a plurality of pressure and gas tight vessels arranged within a common container, provided with a thermally insulating jacket surrounding a block of solid carbon dioxide, said vessels having common means for admitting and discharging gas and said vessels being filled with a compressed gaseous ozone/oxygen mixture containing up to 13% by weight of ozone, a thin fully oxidized coherent inorganic coating covering those parts of the walls in contact with said mixture, said coating being relatively inert to ozone.

26. A device according to claim 25 wherein said jacket is a powder-filled vacuum-jacket.

References Cited by the Examiner

UNITED STATES PATENTS

| | | | |
|---|---|---|---|
| 1,971,397 | 8/1934 | Eichmann et al. | 62—384 X |
| 1,973,881 | 8/1934 | Moody | 62—388 |
| 2,148,109 | 2/1939 | Dana et al. | 62—45 |
| 2,476,345 | 7/1949 | Zaverella | 148—6.15 |
| 2,594,244 | 4/1952 | Winternitz | 62—384 X |
| 2,634,223 | 4/1953 | Clendenin et al. | 148—615 X |
| 2,710,262 | 6/1955 | Larach | 117—97 X |
| 3,101,277 | 8/1963 | Eder et al. | 117—97 X |
| 3,114,469 | 12/1963 | Francis et al. | 62—45 X |

FOREIGN PATENTS 1,237,018  6/1960  France.

OTHER REFERENCES

Rinderer et al.: Cryogenics, "Explosive Boiling in Nitrogen Dewars and Nitrogen Shielded Helium Dewars," September 1962. Pages 288–289 relied on.

ROBERT A. O'LEARY, *Primary Examiner.*

LLOYD L. KING, *Examiner.*